United States Patent [19]
Sawyer

[11] Patent Number: 5,289,574
[45] Date of Patent: Feb. 22, 1994

[54] MULTIPLE VIRTUAL SCREENS ON AN "X WINDOWS" TERMINAL

[75] Inventor: Jon R. Sawyer, Ft. Collins, Colo.

[73] Assignee: Hewlett-Packard Company, Palo Alto, Calif.

[21] Appl. No.: 583,790

[22] Filed: Sep. 17, 1990

[51] Int. Cl.$^5$ ............................................. G06F 3/14
[52] U.S. Cl. ...................................... 395/157; 395/158
[58] Field of Search ............................... 395/144–161, 395/200, 700, 163; 340/747, 721, 723, 724, 747; 370/85.1

[56] References Cited

U.S. PATENT DOCUMENTS

| | | | |
|---|---|---|---|
| 4,204,206 | 5/1980 | Bakula et al. | 395/157 |
| 4,414,621 | 11/1983 | Bown et al. | 395/153 |
| 4,555,775 | 11/1985 | Pike | 395/157 X |
| 4,688,167 | 8/1987 | Agarwal | 395/157 X |
| 4,860,247 | 8/1989 | Uchida et al. | 395/157 X |
| 4,903,218 | 2/1990 | Longo et al. | 395/157 |
| 4,924,410 | 5/1990 | Hamada | 395/153 |
| 5,007,051 | 4/1991 | Dolkas et al. | 370/85.1 |
| 5,036,315 | 7/1991 | Gurley | 395/157 |
| 5,038,301 | 8/1991 | Thoma, III | 395/153 |
| 5,062,060 | 10/1981 | Kolnick | 395/159 |
| 5,113,180 | 5/1992 | Gupta et al. | 340/747 |
| 5,119,494 | 6/1992 | Garman | 395/700 |

OTHER PUBLICATIONS

Hypercard User's Guide, Apple Computer, Inc., 1988, pp. 1–161, 185–191, 194, 195.
Parascandolo, "Screening Room", Mac User, Mar. 1988, pp. 194(8).
Jones, Introduction to the X-Window System, Prentice-Hall, 1989, pp. 27–64.
"HP Visual User Environment", HP Brochure, pp. 4–15 (Jul. 1990).
Chan et al, "Learning Considerations in the Waterloo Port User Interface", *IEEE 1st Int'l Conference on Office Automation*, pp. 33–40 (Dec. 17–19, 1984).
Card et al, "A Multiple Virtual Workspace Interface to Support User Task Switching", *Chi & Gi: 1987 Conference*, pp. 53–59 (Apr. 5–9, 1987).
Jones, "Introduction to the X Window System", Prentice Hall, Inc., pp. 17–18, (1989).
Rosenberg, "Dictionary of Computers, Information Processing and Telecommunications", John Wiley & Sons, pp. 44, 75–76, 247–248, 342, 377 & 631, (1984).
Scheifler et al, "X Window System: C Library and Protocol Reference", Digital Press, pp. 234–235, 268–274, 615–619, 624, 626 (1988).

*Primary Examiner*—Gary V. Harkcom
*Assistant Examiner*—John E. Breene

[57] ABSTRACT

A system providing multiple virtual screens that are associated with one or more display elements in a server within an "X Window" system environment. Only the server within this environment has knowledge that the multiple virtual screens are not multiple hardware frame buffers that serve one or more display elements. The user of the server may change from one virtual screen to another virtual screen in various ways. Since the "X Window" client process is unaware that there are multiple virtual screens, the client sends data to a screen assuming that it is a separate "X Window" screen. When this data is received, the server displays the data only if the particular virtual screen is currently selected for display.

14 Claims, 6 Drawing Sheets

MULTIPLE VIRTUAL SCREENS ON AN "X WINDOWS" TERMINAL

FIELD OF THE INVENTION

This invention relates to computer systems and more particularly to graphical displays within such computer systems. Even more particularly, the invention relates to graphical screens within the "X Windows" protocol.

BACKGROUND OF THE INVENTION

The "X Window System" is a portable software standard developed at the Massachusetts Institute of Technology. It controls the displays of engineering work stations and provides a standard environment to applications software such as page lay-out editors and computer-aided design packages. Applications that use the "X Window System" to operate a workstation display can easily be recompiled and run on a variety of workstations from a variety of computer vendors. The "X Window System" environment has a client process and a server process. The client process typically performs the computations while the server process performs the input/output operations such as graphics display or graphics input. The client and server may be located on the same computer system, however, they may also be located in different computer systems typically connected by a local area network. A server represents the input and output facilities for a single user of the system. A server, in addition to a keyboard and a graphical input device, may have one or more display elements, each of which may have one or more hardware frame buffers wherein each frame buffer maps to a single screen.

If a server has a single display element, the user is limited to the number of windows that can be comfortably operated from such a single display element. If the user wishes to address additional windows in the "X Window System" environment, additional display elements would have to be installed on the server.

Some display servers used with the "X Windows" have multiple hardware frame buffers that serve a single display element. Each of these buffers appears as a separate screen to the "X Window System", and some mechanism is provided to allow the user to switch from displaying one hardware frame buffer to displaying the next.

The "UNIX" operating system sold by the Santa Cruz Operation (SCO) for use on personal computers, allows a limited form of multiple virtual screens for a single display element. In the SCO system, the personal computer keyboard and display can be used to allow multiple users to log-on to the system, or allow a single user to log-on multiple times. By using the function keys on the keyboard of the personal computer, a user can select a new virtual screen which allows the user to log-on again to perform different functions.

There is need in the art for a system which allows multiple virtual screens within the "X Window" environment that would work on a display having a single hardware frame buffer. There is also a need in the art for a system which allows multiple virtual screens within the "X Window" environment that would work on a display having multiple hardware frame buffers. The present invention meets these needs.

SUMMARY OF THE INVENTION

It is an aspect of the invention to allow the use of multiple virtual screens in an "X Window" protocol environment.

It is another aspect of the invention to provide such multiple virtual screens as software buffer descriptions within the server of an "X Window System".

Another aspect of the invention is to provide a method of allowing a client process within the "X Window System" to address any of the multiple virtual screens.

Another aspect is to allow the user of the server to select one of the multiple virtual screens for display on a display element.

A further aspect of the invention is to allow a user of the server to specify the number of multiple virtual screens the server should maintain.

The above and other aspects of the invention are accomplished in a system that provides multiple software buffer descriptions that are associated with a single hardware frame buffer and a single display element in a server within an "X Window System" environment. Only the server within this environment has knowledge that the multiple virtual screens are not multiple hardware frame buffers. That is, the client addresses the server as if each of the software buffer descriptions was a separate hardware frame buffer.

The virtual screen only needs to be represented by a buffer description, not an actual buffer, since the "X Window System" requires that a client process must always be able to repaint its screen. Therefore, if a user requests a different virtual screen, the server notifies the client process which sends data for its windows on the virtual screen just requested, and this data is stored in the hardware frame buffer for display on the display element. The buffer description contains a list of all windows and their location currently open on the virtual screen. This list is used to arrange the received data on the screen.

The user of the server may change from one virtual screen to another virtual screen in various ways. For example, one mechanism used to switch between virtual screens is to change from one virtual screen to another whenever the cursor is moved off one side of the screen. In this manner, if the cursor is moved off the right side of the screen the next higher numbered buffer is selected, whereas if the cursor is moved off the left side of the screen the next lower numbered buffer is selected. This method treats the virtual screens as circular, wherein moving off the left side of buffer zero will cause the highest buffer to be displayed, and moving off the right side of the highest buffer will cause buffer zero to be displayed. Also, some servers may provide function keys to allow the server to select a particular screen wherein one function key is associated with each of the virtual screens.

Since the client is unaware that there are multiple virtual screens, the client sends data to a screen assuming that it is a separate hardware frame buffer and display element. When this data is received, the server displays the data only if the particular virtual screen is currently being stored in a hardware frame buffer.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The following terms are used in this application:

display element—the visual display device as seen by the user of the system, typically a cathode ray tube (CRT).

hardware frame buffer—the data buffer that holds the bits of data (pixels) being displayed on the display element.

screen—the display as addressed by the client process in the "X Window System". In a simple system, having only one display element, one hardware frame buffer, and without using the present invention, a screen maps directly to a hardware frame buffer which, in turn, maps to a display element.

buffer description—a collection of tables that represent a virtual screen. These tables are used to arrange virtual screen data in the hardware frame buffer for display on the display element.

Figure 1:
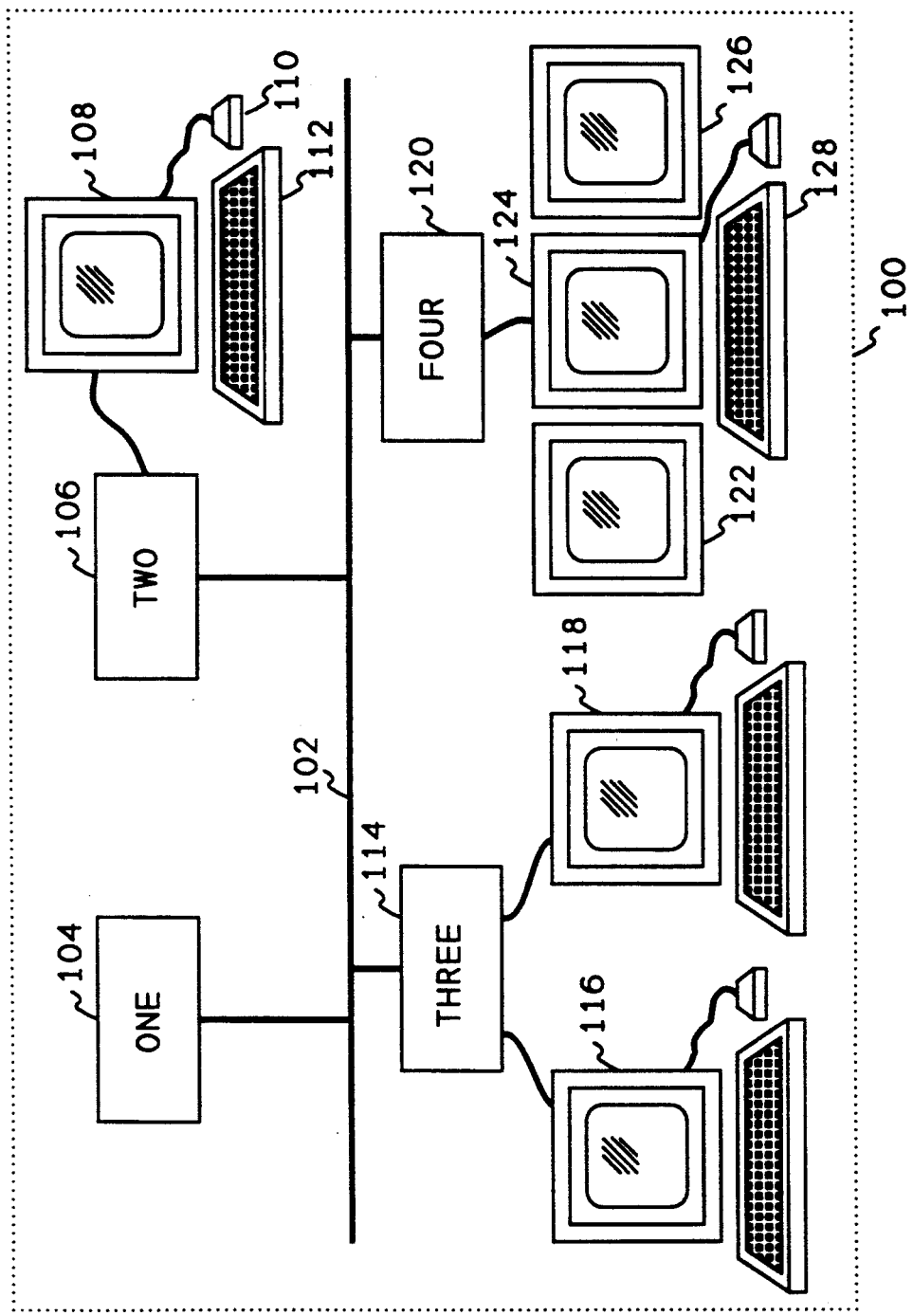
FIG. 1 shows a prior art diagram of a network having multiple clients and multiple servers in a "X Window" environment.

FIG. 1 shows a prior art diagram of a network having multiple clients and multiple servers in an "X Window" environment. Referring now to FIG. 1, an "X Window" environment 100 has a local area network 102 which connects a plurality of computers 104, 106, 114 and 120. A first computer 104 is a file and computation CPU since it does not have any locally attached displays. The computer 104 would typically contain one or more client processes within the "X Window" environment. A second computer 106 has a display element 108, a mouse graphical input device 110, and a keyboard input device 112. A third computer 114 has two locally attached display elements 116 and 118. A fourth computer 120 has a plurality of locally attached display embodiments 122, 124, and 126, however, it has only a single keyboard 128. Thus, the three display elements serve only a single user. Any of the display elements 108, 116, 118, 122, 124 Or 126 could have multiple hardware frame buffers associated with the display element.

Figure 2:
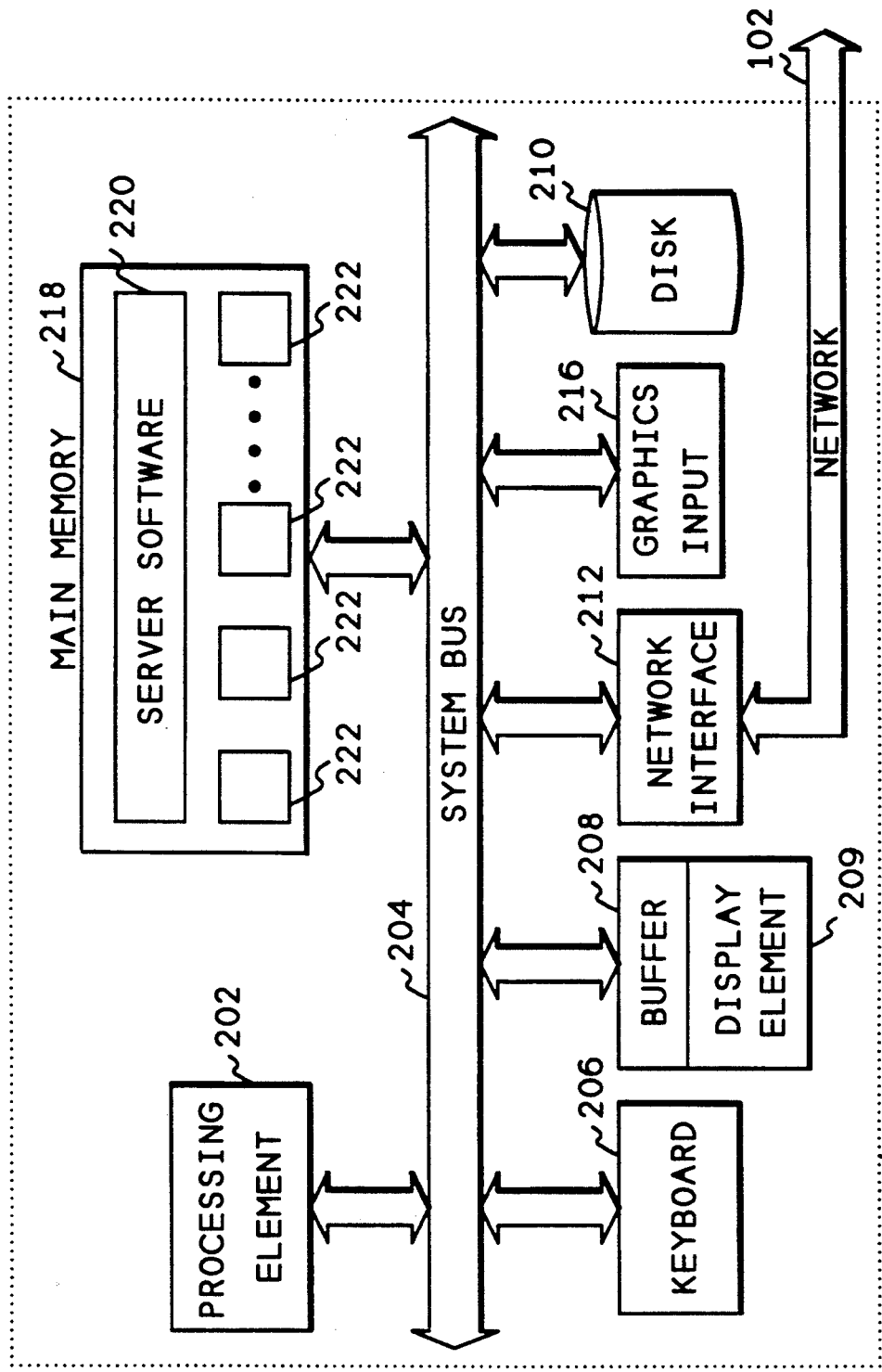
FIG. 2 shows a block diagram of the present invention with a single hardware frame buffer and display element.

FIG. 2 shows a block diagram of the present invention having a single hardware frame buffer connected to a single display element. Referring now to FIG. 2, a server 200 contains a processing element 202 that performs the instructions within the server software 220 which is contained in a main memory 218. The processing element 202 communicates with other elements of the system over a system bus 204. The server also contains a keyboard 206 for accepting text input from a user, and a graphics input device 216 for accepting graphical input. An example of a graphics input device would be a mouse. A network interface 212 is used by the server to communicate to the client process, if such client process resides in another computer system and sometimes when the client process resides in the same system. The display element 209 is used by the server to display graphics as requested by the client process. Within the main memory 218 the server software 220 performs all operations requested by the client process, and uses a plurality of software buffer descriptions 222 as the virtual screens.

When a user begins using the server 200, the user defines the number of virtual screens desired for the session and the server software 220 allocates, from the main memory 218, a software buffer description 222 for each virtual screen. The buffer descriptions 222 could be allocated from virtual memory wherein the contents of the buffer description are stored on the disk 210, as virtual memory pages, when not being used by the server software 220. By using virtual memory, a much larger number of buffer descriptions would typically be available to the user of the system, which provides a significant advantage over hardware buffers. When the server 200 establishes communications with the window manager client process, the server 200 will identify each of the buffer descriptions 222 as a separate screen to the window manager or any other client process. Thereafter, the client process will provide commands to the server 200 in the same manner it would provide commands to a server that had an actual number of hardware frame buffers equal to the number of virtual screens contained in the server 200. That is, when a client process creates a window on one of the virtual screens, a description of the window will be constructed within the corresponding buffer description 222 and will only be displayed on the graphics display if that particular buffer description 222 is currently being displayed in the hardware frame buffer 208 and on the display element 209.

At any time, a user may request that a different virtual screen be displayed, and when such request is made, the server software 220 will display the contents of the corresponding buffer description 222 on the display element 209 by asking the client processes with windows on that screen to repaint their windows.

If the server has a backing store option, the server may use the backing store to keep a copy of the data displayed in some windows. In this case, when a user requests a different virtual screen, the window data for windows on that screen is copied from the backing store to the hardware frame buffer, rather than asking the client process to repaint.

Figure 3:
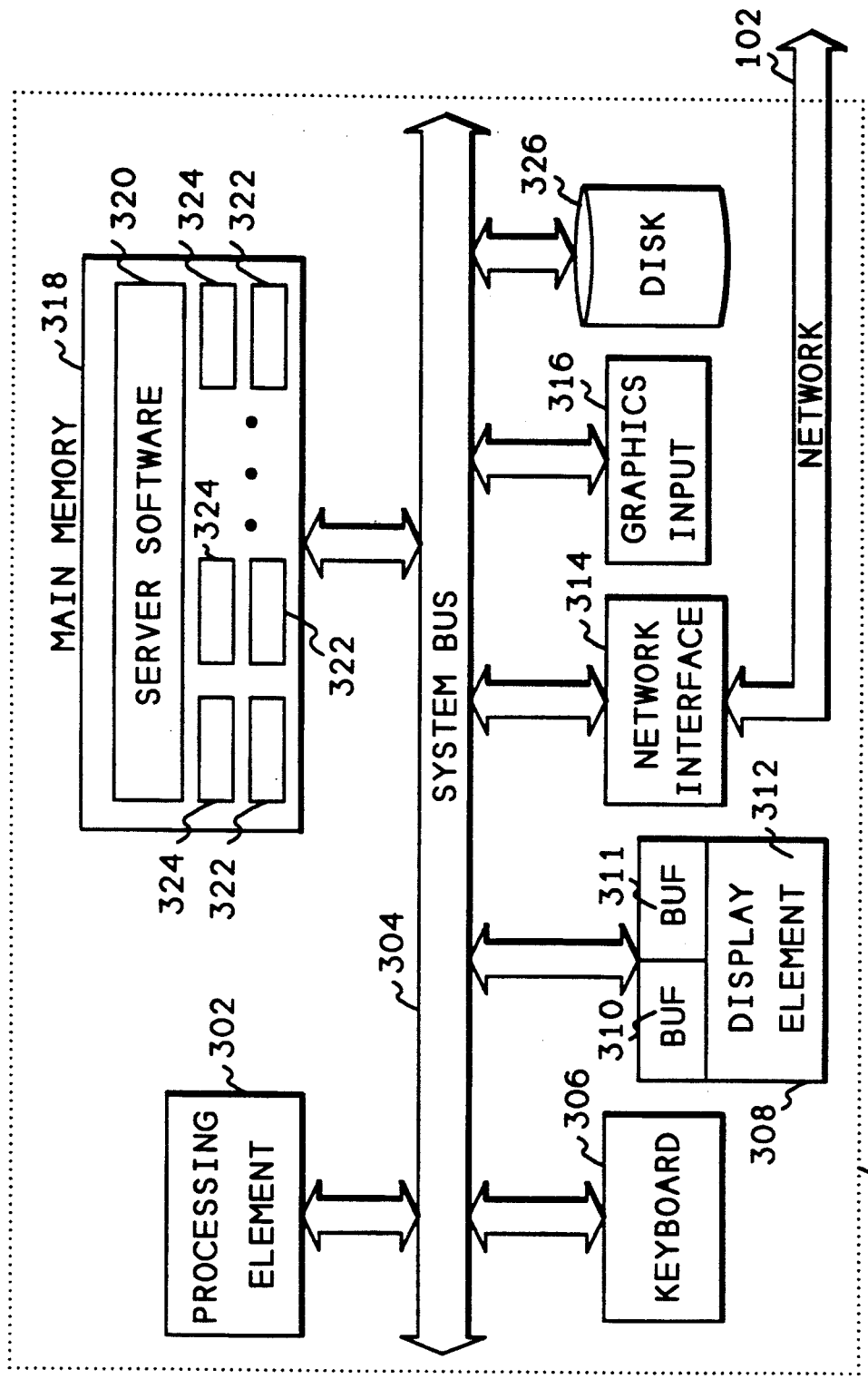
FIG. 3 shows a block diagram of the present invention with multiple hardware frame buffers for the display element.

FIG. 3 shows a block diagram of the present invention which has multiple hardware frame buffers per display element. Referring now to FIG. 3, a server 300 contains a processing element 302 which communicates with other elements of the system over a system bus 304. A keyboard 306 is used for text input, and a graphics input device 316, such as a mouse, is used to input graphical information into the system. A network interface 314 is used to communicate to the client process within the system. A graphics display device 308 contains a display element 312 and two hardware frame buffers 310 and 311. A main memory 318 contains server software 320 which processes all the commands sent by the client process to the server 300. Contained in the main memory 318 is a set of software buffer descriptions 322. Also contained in the memory 318 is a second set of software buffer descriptions 324. The set of software buffer descriptions 322 will serve as multiple virtual screens for the hardware frame buffer 310. The set of software buffer descriptions 324 will serve as multiple virtual screens for the hardware frame buffer 311. The number of buffer descriptions in the sets 322 and 324 may be different. The total number of virtual screens, M+1, is divided between the sets of software buffer descriptions 322 and 324.

With the system as described in FIG. 3, the hardware frame buffers 310 and 311 allow the display element 312 to display two different graphics images, at the user request. That is, the user can request either that hardware frame buffer 310 or that hardware frame buffer 311 be displayed on the display element 312. For each of the buffers 310 and 311, a set of buffer descriptions 322 or 324 respectively allow each of the buffers 310 and 311 to have multiple virtual screens.

A system may also have multiple display elements, each with a corresponding set of one or more hardware frame buffers, wherein each hardware frame buffer may have a plurality of software buffer descriptions.

Figure 4:
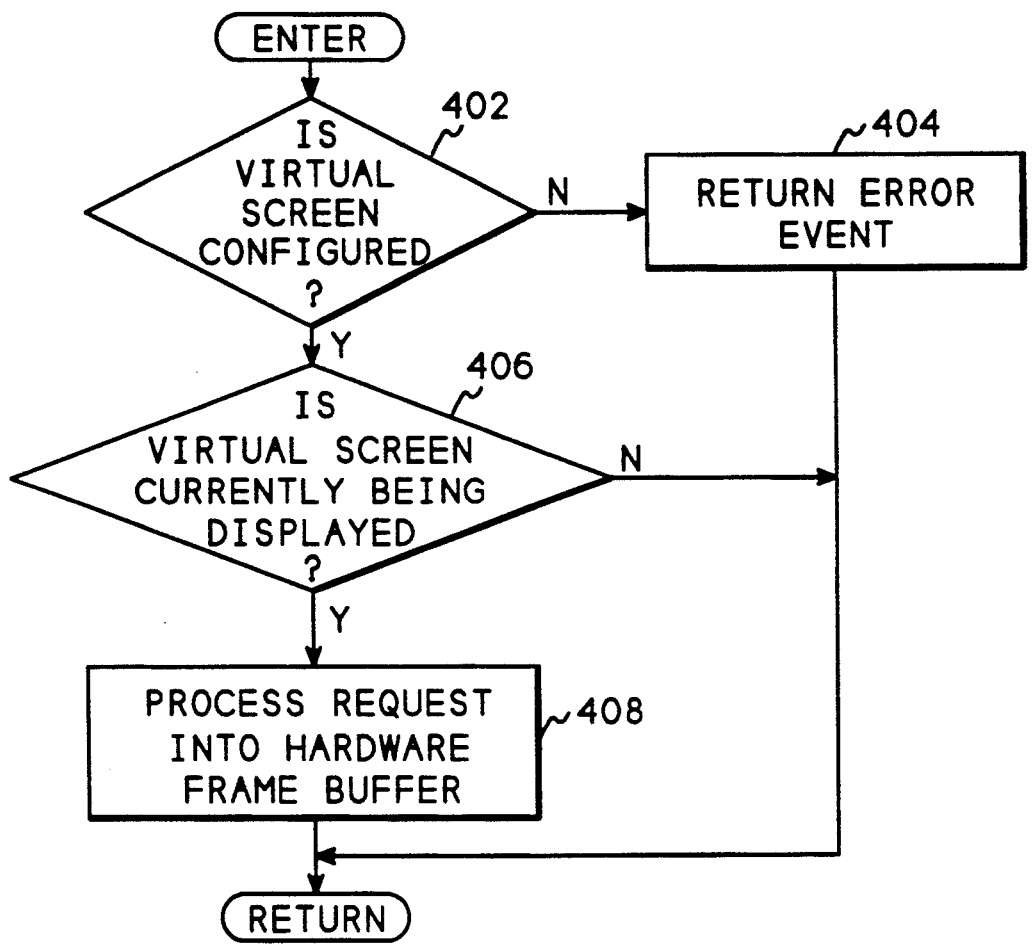
FIG. 4 shows a flowchart of the process of receiving a client request in the present invention.

FIG. 4 shows a flowchart of the process of receiving a client request in the server 200 or 300 of the present invention. Referring now to FIG. 4, when the request is received, the flowchart is entered and block 402 determines whether the virtual screen requested in the client request has been configured. That is, has the client process requested a virtual screen with a number that has not been configured into the server? If the client request is for a screen with a number that has not been configured, block 402 transfers to block 404 which returns an error event back to the client process before returning. If the requested screen has been configured, block 402 transfers to block 406 which determines whether the virtual screen is currently being displayed. If the virtual screen requested is not currently being displayed, the request is ignored and FIG. 4 returns to its caller. This is possible because a client process must always repaint a screen upon request, therefore ignoring a request for an undisplayed virtual screen does not lose any data.

If the virtual screen is currently being displayed, that is, its data is being placed in a hardware frame buffer, control transfers to block 408 which processes the request and stores the graphics data into the proper hardware frame buffer before returning to the caller.

Figure 5:
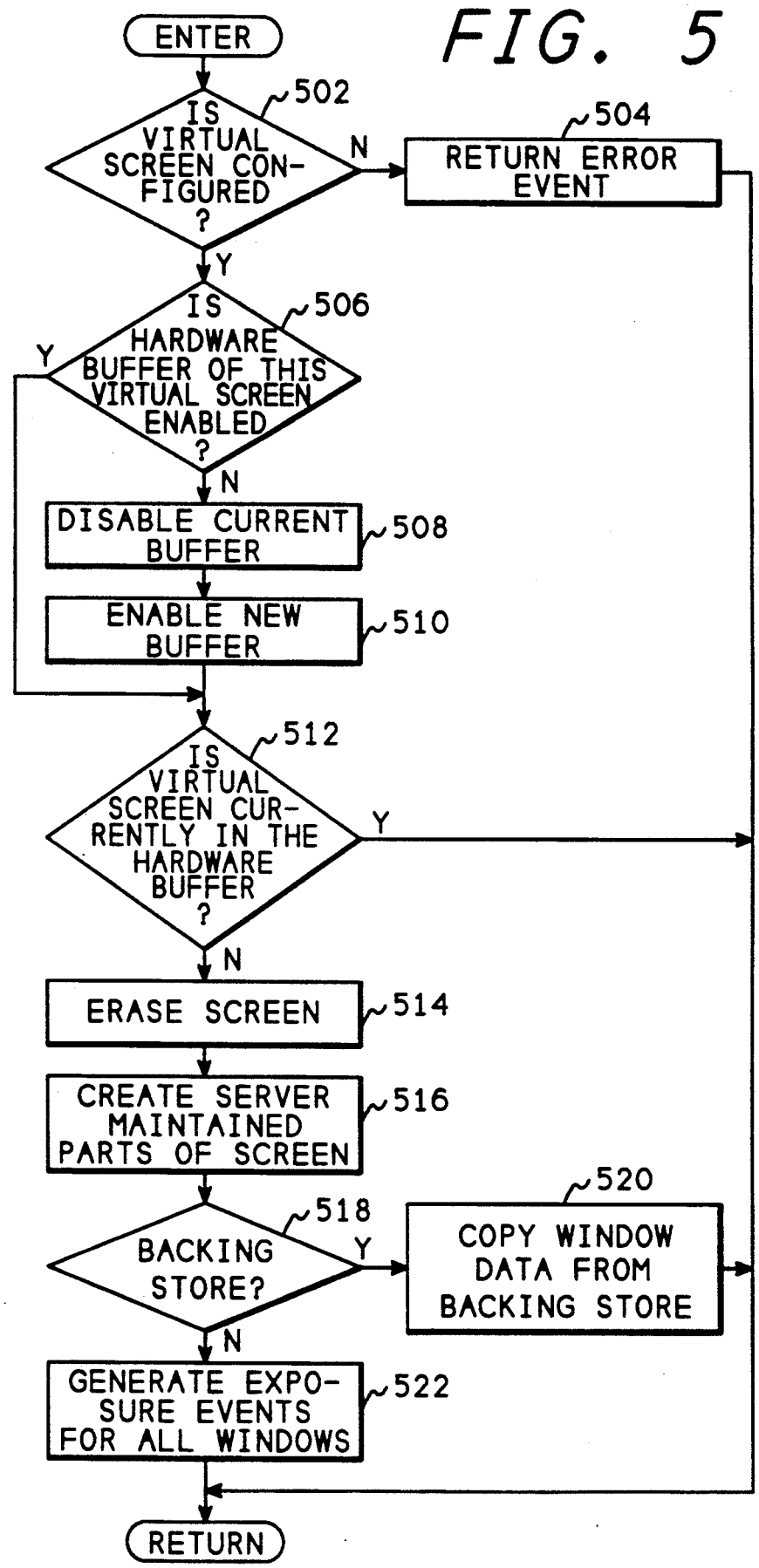
FIG. 5 shows a flowchart of the process of changing from one virtual screen to another in the present invention.

FIG. 5 shows a flowchart of the process of changing from one virtual screen to another in the present invention. The process of this flowchart will be called whenever the user requests a change in the virtual screen being displayed. This request could be accomplished in a number of ways. For example, a higher numbered virtual screen could be selected whenever the user uses the graphics input device of the server to move the cursor off the right side of the screen. If the user moves the cursor off the left side of the screen, the next lower numbered virtual screen buffer would be selected. Also, the buffers act in a circular manner and wrap around, so moving off the right side of the highest numbered screen causes the lowest numbered screen to be displayed, and moving off the left of the lowest numbered screen causes the highest numbered screen to be displayed.

Referring now to FIG. 5, after entry, block 502 determines whether the virtual screen has been configured. If the virtual screen requested has not been configured, block 502 transfers to block 504 which returns an error. As described earlier, the virtual buffer descriptions act in a circular manner, so if the graphical input device is being used to request a new virtual screen, the buffers will wrap and the virtual screen will always be configured. If some other manner is being used to request a virtual screen, such as, for example, a user entering a virtual screen number, the virtual screen requested may be invalid.

If the virtual screen has been configured, block 502 transfers to block 506 which determines whether the hardware frame buffer of this virtual screen has been enabled. Since the user has requested that a new virtual screen be displayed, its corresponding hardware frame buffer must also be enabled for the user to see the screen data. If the hardware frame buffer has not been enabled, block 506 transfers to block 508 which disables the current hardware frame buffer for the display element and then block 510 enables the correct hardware frame buffer for this virtual screen. After enabling the correct buffer or if the correct buffer was already enabled, control goes to block 512 which determines whether the virtual screen is currently in the hardware frame buffer. If the virtual screen data is already in the hardware frame buffer, block 512 simply returns to its caller since the data is currently being displayed. If the virtual screen is not currently in the hardware frame, block 512 transfers to block 514 which erases the current contents of the hardware frame buffer, and then block 516 creates the server maintained parts of the screen. For example, typically the server maintains the background pattern of the screen that occurs behind all windows if the windows do not completely occupy the screen. After creating the server maintained parts of the screen, block 516 transfers to block 518 which determines whether backing store is being used. If a backing store is being used, block 518 transfers to block 520 which copies window data from the backing store into the hardware frame buffer. If a backing store is not being used block 518 transfers to block 522 which generates exposure events for all windows on this virtual screen causing the client processes having those windows to repaint the window data. After the exposure events or after copying data from the backing store, FIG. 5 returns to the caller. When the backing store is being used, some windows may still need to be repainted by the client process.

Figure 6:
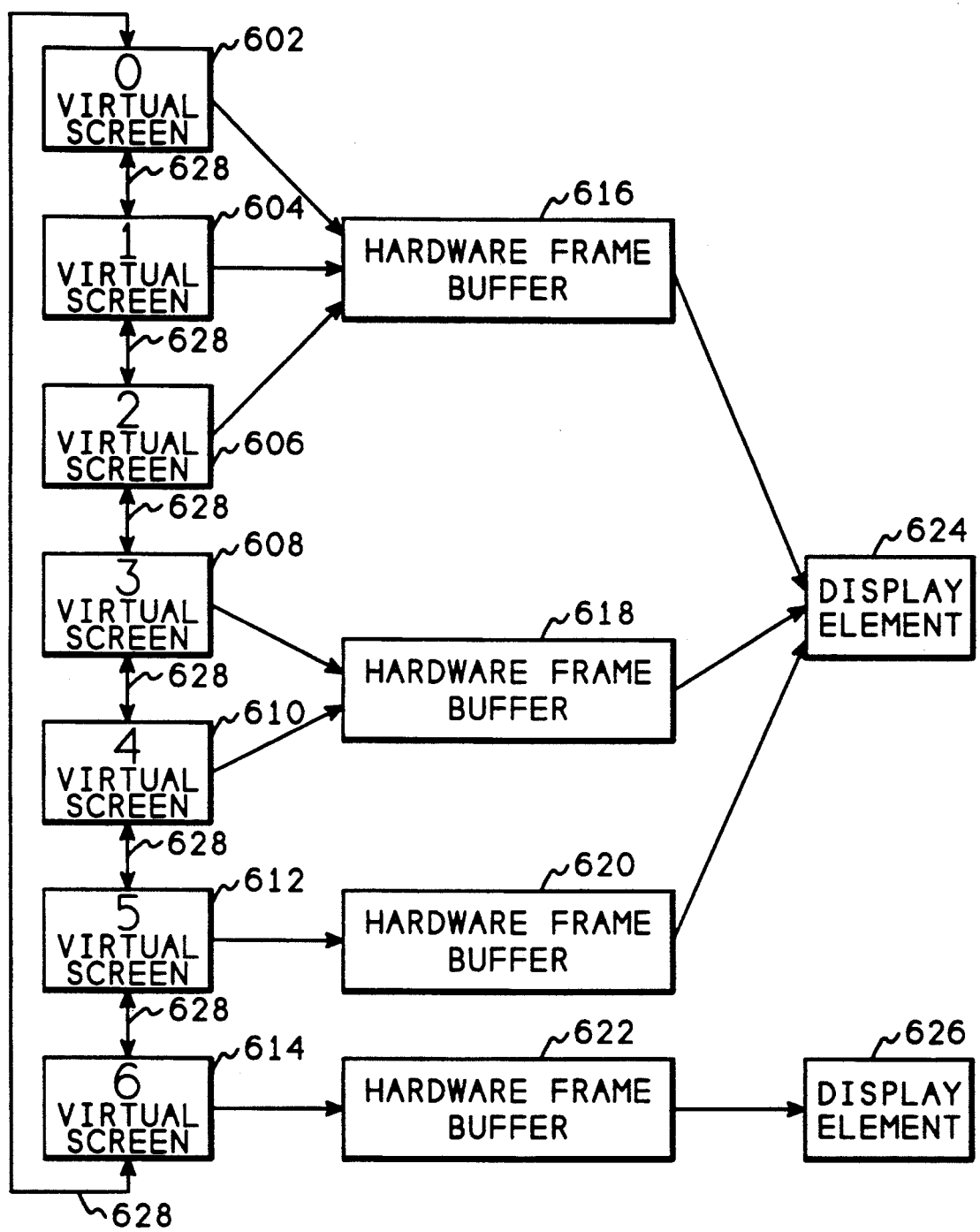
FIG. 6 shows an example of a plurality of virtual screens configured for various hardware frame buffers and display elements.

FIG. 6 shows an example diagram of several virtual screens which have been configured by a user for use on two display elements having four hardware frame buffers. Referring now to FIG. 6, a plurality of virtual screens 602, 604, 606, 608, 610, 612, and 614 have been configured by a user for use in system having four hardware frame buffers 616, 618, 620, and 622, which are connected to two display elements 624 and 626. As an example of changing virtual screens assume that the user initially configured virtual screen two 606 for display on display element 624. When the user decides to change from the displaying virtual screen two 606 to displaying virtual screen three 608, the system, as described above with respect to FIG. 5, will first enable hardware frame buffer 618 for display on display element 624 and will then create the windows within virtual screen three 608 in the hardware frame buffer 618. As described above with respect to FIG. 5, this can be done either by copying window data from a backing store, if a backing store is available, or by generating exposure events for all windows within virtual screen three 608. After the windows have been created in the hardware frame buffer 618 and the hardware frame buffer 618 has been enabled for display on display element 624, the windows of virtual screen three 608 will display on display element 624. In a similar manner, windows will be created in each of the virtual screens as the user enables subsequent virtual screens. The user may enable virtual screens in the order shown with respect to arrows 628, however, note that virtual screen six 614 will always display on display element 626.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for displaying a plurality of user selectable virtual screens of data on a single display element, said system comprising:
    means for allocating a plurality of buffer descriptions for arranging and storing data, one of said plurality of buffer descriptions being allocated for each of said plurality of virtual screens, each of said buffer descriptions representing one of said plurality of virtual screens, each of said virtual screens containing a plurality of client windows, each of said plurality of client windows representing one or more client processes, wherein each of said plurality of virtual screens supports more than one client process;
    means for a user selecting one of said plurality of buffer descriptions for arranging display data; and
    means for receiving display data from a client process and using said selected buffer description to arrange said display data on said display element.

2. The system of claim 1 wherein said means for allocating a plurality of buffer descriptions further comprises means for allocating said buffer descriptions on a data storage device as virtual memory.

3. The system of claim 1 wherein said means for selecting one of said plurality of buffer descriptions comprises:
    means for determining a location of a cursor on said display element;
    means for causing said cursor to move to a new location on said display element; and
    means for selecting a different buffer description when said cursor is moved to an edge of said display element.

4. The system of claim 3 wherein said selecting means further comprises:
    means for selecting a higher numbered buffer description when said cursor is moved to a right edge of said display element; and
    means for selecting a lower numbered buffer description when said cursor is moved to a left edge of said display element.

5. The system of claim 1 wherein the quantity of said plurality of buffer descriptions of user selectable.

6. An "X Window" server system for displaying a plurality of user selectable virtual screens of data on one or more display elements, each having one or more hardware frame buffers, said system comprising:
    means for allocating a plurality of buffer descriptions for arranging and storing data, one of said plurality of buffer descriptions being allocated for each of said plurality of virtual screens, each of said buffer descriptions representing one of said plurality of virtual screens, each of said virtual screens containing a plurality of client windows, each of said plurality of client windows representing one or more client processes, wherein each of said plurality of virtual screens supports more than one client process;
    means for connecting at least one of said buffer descriptions to each of said hardware frame buffers;
    means for a user selecting one of said plurality of buffer descriptions for arranging display data;
    means for selecting one of said plurality of hardware frame buffers for displaying display data on one of said display elements; and
    means for receiving display data from a client process and using said buffer descriptions to arrange said display data into said selected hardware frame buffer and onto one of said display elements.

7. The system of claim 6 wherein said means for allocating a plurality of buffer descriptions further comprises means for allocating said buffer descriptions on a data storage device as virtual memory.

8. The system of claim 6 wherein said means for selecting one of said plurality of buffer descriptions for display comprises:
    means for determining a location of a cursor on said display element;
    means for causing said cursor to move to a new location on said display element; and
    means for selecting a different buffer description when said cursor is moved to an edge of said display element.

9. The system of claim 8 wherein said selecting means further comprises:
    means for selecting a higher numbered buffer description when said cursor is moved to a right edge of said display element; and
    means for selecting a lower numbered buffer description when said cursor is moved to a left edge of said display element.

10. The system of claim 6 wherein the quantity of said plurality of buffer descriptions is user selectable.

11. A process for displaying a plurality of user selectable virtual screens of data on a display element, said process comprising the steps of:
    allocating a plurality of buffer descriptions for arranging and storing data, one of said plurality of buffer descriptions being allocated for each of said plurality of virtual screens, each of said buffer descriptions representing one of said plurality of virtual screens, each of said virtual screens containing a plurality of client windows, each of said plurality of client windows representing one or more client processes, wherein each of said plurality of virtual screens supports more than one client process;

selecting by a user one of said plurality of buffer descriptions for arranging display data; and receiving by server software display data from a client process and using said selected buffer description to arrange said display data onto said display element.

12. The process of claim 11 wherein said step of allocating a plurality of buffer descriptions further comprises the step of allocating said buffer descriptions on a data storage device as virtual memory.

13. The process of claim 11 wherein said step of selecting one of said plurality of buffer descriptions for display comprises the steps of:

determining a location of a cursor on said display element;

selecting a different buffer description when said cursor is moved to an edge of said display element.

14. The process of claim 13 wherein said selecting step further comprises the steps of:

selecting a higher numbered buffer description when said cursor is moved to a right edge of said display element; and selecting a lower numbered buffer description when said cursor is moved to a left edge of said display element.

* * * * *